United States Patent
Hart et al.

(10) Patent No.: US 9,687,004 B2
(45) Date of Patent: Jun. 27, 2017

(54) DEVICE FOR REMOVING SKIN OF MEAT CUTS OF IRREGULAR THICKNESS

(71) Applicant: Marel Meat Processing Inc., Des Moines, IA (US)

(72) Inventors: Colin R. Hart, Ankeny, IA (US); Matthew A. Bergman, Des Moines, IA (US); William A. Johnson, Prairie City, IA (US)

(73) Assignee: Marel Meat Processing Inc., Des Moines, IA (US)

( * ) Notice: Subject to any disclaimer, the term of this patent is extended or adjusted under 35 U.S.C. 154(b) by 246 days.

(21) Appl. No.: 14/307,806

(22) Filed: Jun. 18, 2014

(65) Prior Publication Data
US 2014/0378039 A1 Dec. 25, 2014

Related U.S. Application Data

(60) Provisional application No. 61/837,268, filed on Jun. 20, 2013.

(51) Int. Cl.
*A22C 21/00* (2006.01)
*A22C 25/17* (2006.01)
*A22B 5/16* (2006.01)

(52) U.S. Cl.
CPC ............ *A22B 5/16* (2013.01); *A22B 5/166* (2013.01); *A22C 21/0092* (2013.01); *A22C 25/17* (2013.01)

(58) Field of Classification Search
CPC ....... A22B 5/16; A22B 5/166; A22C 21/0092; A22C 25/17

USPC ................ 452/125, 127, 128, 130
See application file for complete search history.

(56) References Cited

U.S. PATENT DOCUMENTS

| | | | | |
|---|---|---|---|---|
| 2,215,114 A | * | 9/1940 | Baader | A22C 25/17 452/127 |
| 2,659,402 A | | 11/1953 | Townsend | |
| 2,806,245 A | * | 9/1957 | Bartels | A22C 25/17 452/127 |
| 4,628,570 A | * | 12/1986 | Wenzel | A22C 25/17 452/127 |
| 4,970,755 A | | 11/1990 | Leblanc | |
| 5,023,975 A | * | 6/1991 | Van Der Hoorn | A22C 17/0046 452/135 |
| 5,085,140 A | * | 2/1992 | Kunig | B30B 9/241 100/121 |

(Continued)

FOREIGN PATENT DOCUMENTS

| | | |
|---|---|---|
| CA | 2853882 A1 | 5/2013 |
| DE | 4025600 A1 | 2/1992 |

(Continued)

*Primary Examiner* — David Parsley
(74) *Attorney, Agent, or Firm* — Zarley Law Firm, P.L.C.

(57) ABSTRACT

A device for removing skin from meat cuts of irregular thickness is presented. The device for removing skin from meat cuts includes an overhead roller having a drive roller and a pair of idler rollers rotatably mounted to a pair of support plates. The device further includes a belt extending around the driver roller and pair of idler rollers. A support shaft extends between the support plates within a loop of the belt. A plurality of resistive devices are attached to the hold down members to provide varying resistance when a meat product is lifted into contact with the belt.

18 Claims, 5 Drawing Sheets

(56) References Cited

U.S. PATENT DOCUMENTS

| | | | |
|---|---|---|---|
| 5,090,939 A * | 2/1992 | Leblanc | A22C 17/0006 |
| | | | 452/127 |
| 5,186,313 A | 2/1993 | Denker et al. | |
| 5,558,573 A * | 9/1996 | Basile, II | A22C 17/12 |
| | | | 452/127 |
| 6,129,625 A | 10/2000 | Cate et al. | |
| 6,277,019 B1 | 8/2001 | Veldkamp et al. | |
| 6,558,242 B2 * | 5/2003 | Veldkamp | A22C 17/0086 |
| | | | 452/127 |
| 8,197,311 B2 * | 6/2012 | Schwarz | A22B 5/166 |
| | | | 452/127 |
| 9,039,498 B2 * | 5/2015 | Schwarz | A22C 25/08 |
| | | | 452/127 |

FOREIGN PATENT DOCUMENTS

| | | | |
|---|---|---|---|
| EP | 2591681 A1 | | 5/2013 |
| WO | WO 2013/072247 | * | 5/2013 |

\* cited by examiner

US 9,687,004 B2

DEVICE FOR REMOVING SKIN OF MEAT CUTS OF IRREGULAR THICKNESS

CROSS REFERENCE TO RELATED APPLICATION

This application claims the benefit of U.S. Provisional Application No. 61/837,268 filed Jun. 20, 2013.

BACKGROUND OF THE INVENTION

This invention is directed to a device for skinning meat cuts of irregular thickness and more particularly to a skinning device that provides selective resistance to a meat product.

Utilization of conveyors to skin meat, poultry and fish is known in the industry. Currently, flat pieces are predominantly skinned in this manner because the pressure used to hold the meat product against the blade and toothroller holds the food product down firmly. This pressure causes the majority of the skin of the food product to contact the blade and be removed.

While useful, when the configuration of the food product is not flat, uniform pressure deforms the product, causes product loss, and misses the skin on the thinner parts of the meat product. Also, the heavy pressure across the food product may cause damage to the thicker portion while attempting to skin the thinner portion and it is difficult to maintain the belt in a centered position. Therefore, a need exists in the art for a device that addresses these deficiencies.

An objective of the present invention is to provide a device for skinning meat products by providing selective resistance to portions having different thickness.

A further objective is to provide a skinning device that is compliant to and quickly conforms to a food product's thickness.

A still further objective is to provide a device for skinning meat products that does not deform the product, does not cause product damage and maximizes skin removal.

These and other objectives will be apparent to one of ordinary skill in the art based upon the following written description and drawings.

SUMMARY OF THE INVENTION

A device for removing skin from meat cuts of irregular thickness is presented. The device for removing skin from meat cuts includes an overhead roller having a drive roller and a pair of idler rollers rotatably mounted to a pair of support plates. The device further includes a belt extending around the driver roller and pair of idler rollers. A support shaft having at least one hold down members extends between the support plates within a loop of the belt. A plurality of resistive devices are attached to the hold down members to provide varying resistance when a meat product is lifted into contact with the belt.

DETAILED DESCRIPTION OF THE PREFERRED EMBODIMENTS

Figure 1:
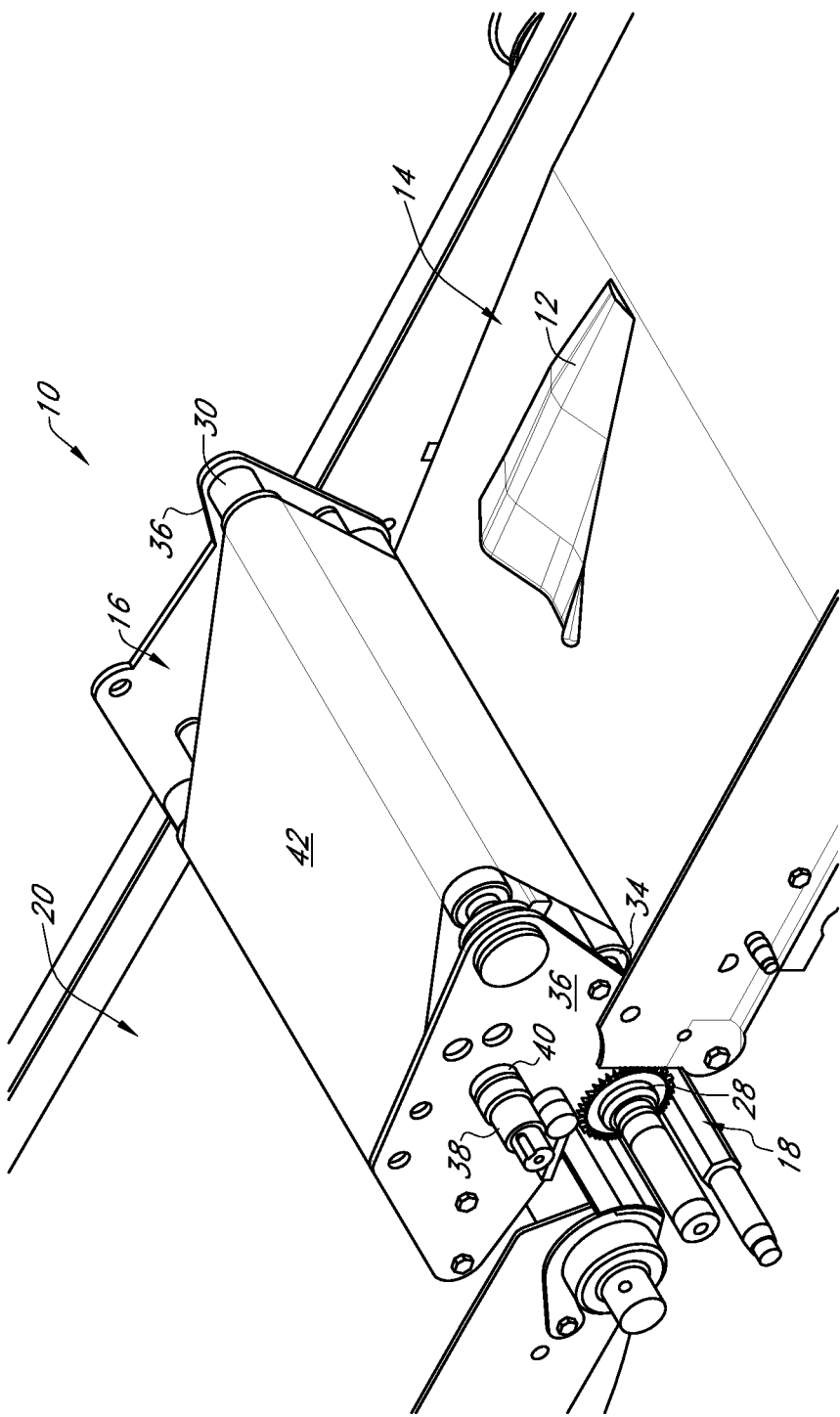
FIG. 1 is an isometric view of a device for removing skin from meat cuts of irregular thickness.
Figure 2:
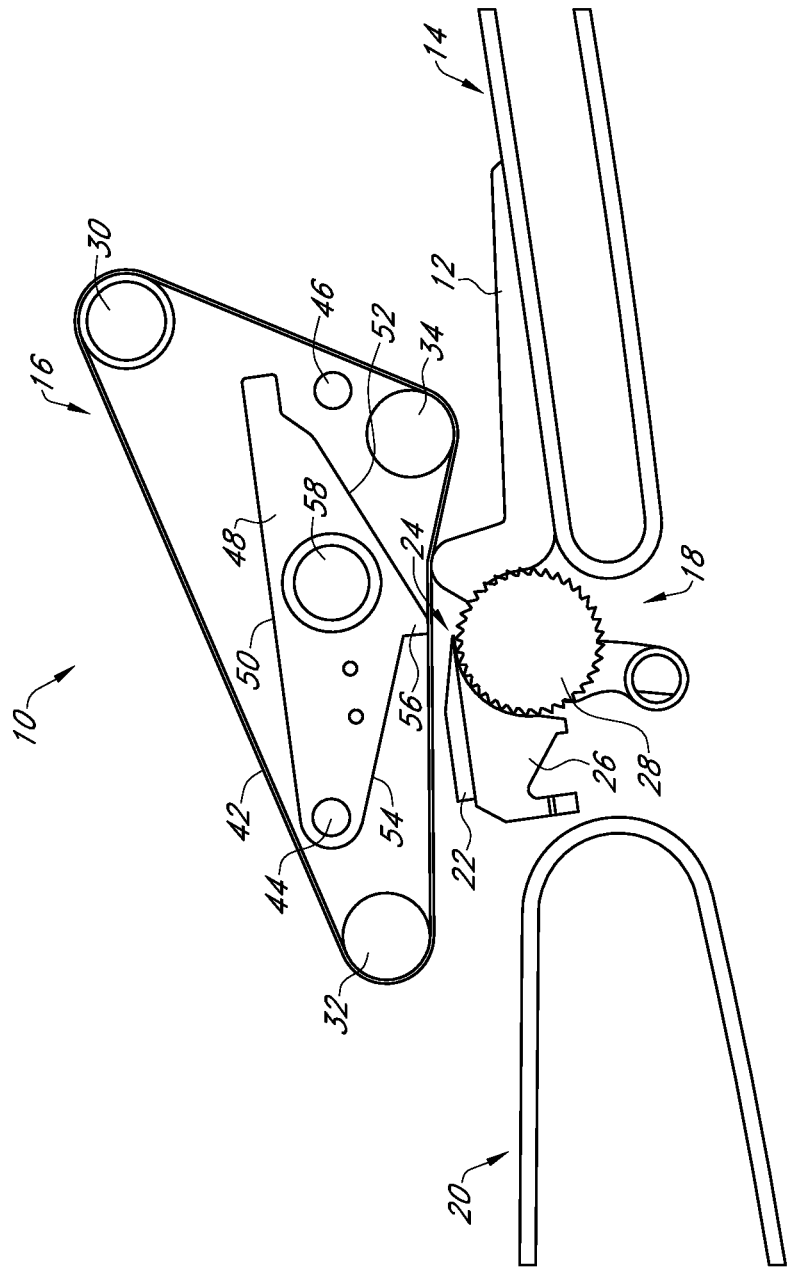
FIG. 2 is a side elevation view of a device for removing skin from meat cuts of irregular thickness with a meat cut approaching.
Figure 3:
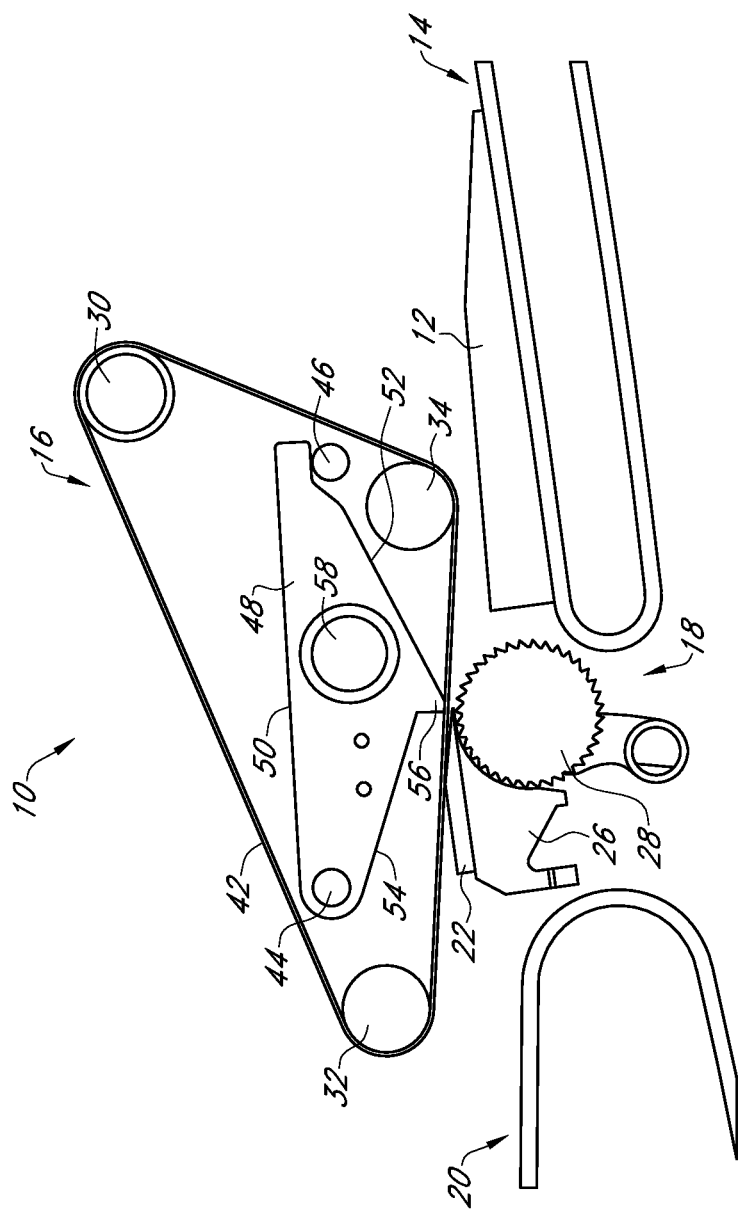
FIG. 3 is a side elevation view of a device for removing skin from meat cuts of irregular thickness with a meat cut approaching.
Figure 4:
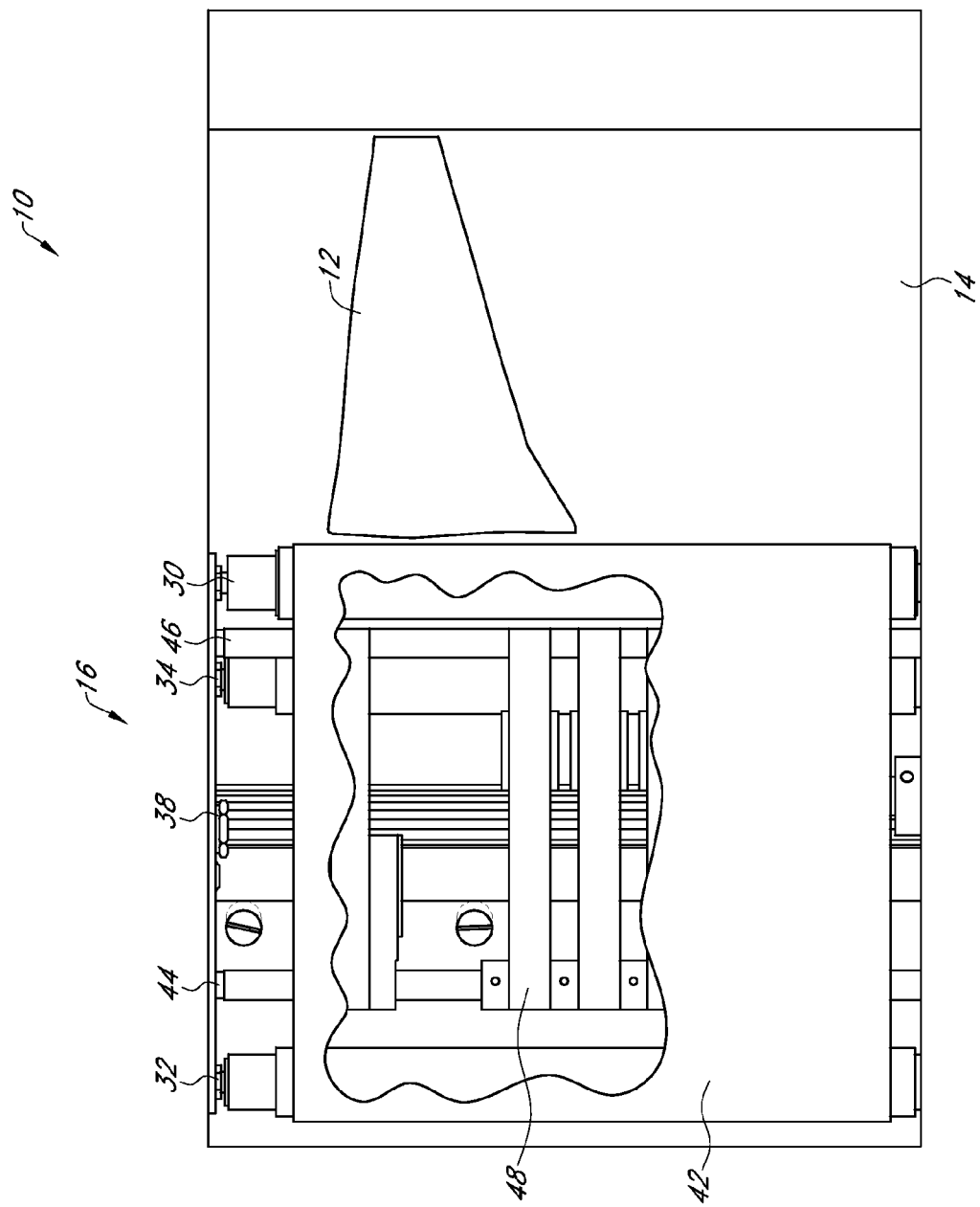
FIG. 4 is a plan view of a device for removing skin from meat cuts of irregular thickness.
Figure 5:
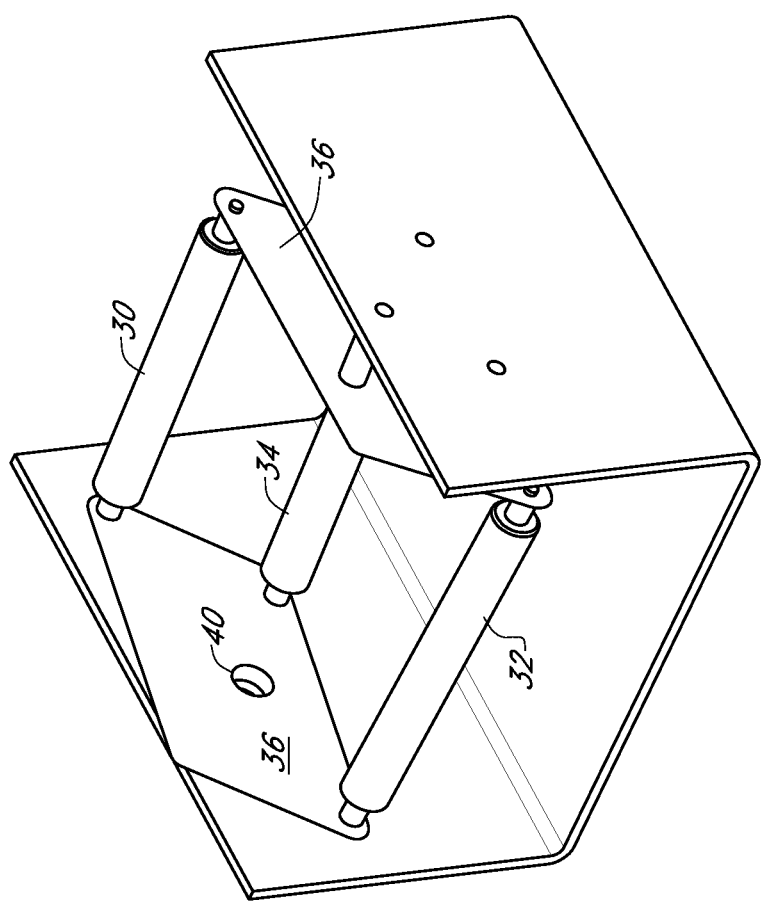
FIG. 5 is a perspective view of a device for removing skin from meat cuts of irregular thickness.

Referring to the Figures, a device 10 for removing skin from meat cuts 12 having irregular thickness includes a feeder or incoming conveyor 14, an overhead conveyor 16, a skinning assembly 18, and a discharge conveyor 20. Meat cuts 12 include meat, poultry, and fish of varying shapes and sizes.

The feeder conveyor 14 is of any type and is positioned to bring the meat cut 12 below the overhead conveyor 16 to engage the skinning assembly 18. While the feeder conveyor 14 is shown with a single lane, multiple lanes may be used as well to address left and right meat cuts 12.

The skinning assembly 18, which is positioned below the overhead conveyor 16, includes a blade clamp 22, a cutting blade 24, a shoe 26 and a toothroll 28 that are mounted to a frame (not shown). The overhead conveyor 16 includes a drive roller 30 and a pair of idler rollers 32 and 34 that are rotatably mounted to a pair of support plates 36. The support plates 36 are connected to the frame on one side preferably by an eccentric screw 38 that extends through a cam hole or slot 40. The cam slot 40 is larger than the shaft of the screw 38 and permits the plates 36 to be twisted with respect to each other, as will be explained later. Extending around rollers 30, 32 and 34 is a soft continuous belt 42 preferably made of urethane. The belt 42 is soft and compliant and will conform to the shape of the meat cut 12 quickly while providing a slight pressure. In an alternative arrangement, the belt 42 can be made up of a series of narrow belts 42.

Within the loop of the belt 42 or series of belts 42, and extending between and connected to support plates 36, is a support shaft 44 and a stop bar 46. Pivotally attached to shaft 44 are a plurality of hold down members 48. Preferably the hold down member 48 has a top edge 50, a food engaging edge 52 and a rearward edge 54. Edges 52 and 54 angle downwardly and terminate at a nub 56 that is positioned above and adjacent the point where the meat cut 12 contacts the blade 24. The stop bar 46 is positioned such that when the hold down member 48 engages the stop bar 46, the nub 56 dwells above or only lightly engages belt 42. Also, resistive devices 58 such as weight are provided within or attached to the hold down members 48 to provide varying resistance. Alternatively, air resistance and/or spring resistance could be used instead of weights for the resistive devices 58. In one arrangement, the resistive devices 58 apply firmer pressure to thinner parts of the meat cut 12 and less pressure to thicker parts of the meat cut 12. Varying the pressure applied by the resistive devices 58 results in selective tension of the belt 42 when it engages the meat cut 12. Also, instead of using hold down members 48, a roller filled with air or a mat material may be used.

In operation a meat cut 12 is transported by the feeder conveyor 14 to the toothroll 28 of the skinning assembly 18. The toothroll 28 engages the meat cut 12 and transports the meat cut 12 over the toothroll 28 toward the blade 24. As the meat cut 12 is transported over the toothroll 28 the meat cut 12 is lifted into contact with the belt 42, which engages the meat cut 12 in a compliant non-reinforced manner to provide minimal or slight compression to the meat cut 12. As the meat cut 12 is further transported toward the blade 24, the nub 56 of the hold down members 48 provide resistance or hold down pressure to the meat cut 12 based on the selected weights as the meat cut 12 engages the blade 24.

Since the belt 42 runs tangent to the rollers 32 and 34 when the meat cut 12 is not present, the meat cut 12 increases the tension in the belt 42 as it is pressed against the skinning assembly 18. This arrangement will increase the contact pressure of the belt 42 on the drive roller 30. This improves the drive force of the drive roller 30 on the belt 42.

As the belt 42 rotates about rollers 30, 32, and 34, the belt 42 may track to the left or right and will not remain centered on the rollers. This condition is worsened because the belt 42 is wide compared to its length. To prevent this, eccentric screw 38 is rotated such that plates 36 twist with respect to each other, which cooperatively positions the axis of each roller 30, 32, and 34 to gain tracking control of the belt 42. This causes the belt 42 to remain generally centered upon the rollers 30, 32, and 34.

What is claimed:

1. A device for removing skin from meat cuts of irregular thickness comprising:
    an overhead conveyor having a drive roller and a pair of idler rollers rotatably mounted to a pair of support plates;
    a belt extending around the driver roller and the pair of idler rollers;
    at least one hold down member extending between the support plates within a loop of the belt;
    a plurality of resistive devices attached to the at least one hold down member, the plurality of resistive devices configured to provide different resistive strength to the at least one hold down member; and
    a feeder conveyor, a discharge conveyor, and a skinning assembly having a toothroll positioned below the overhead conveyor.

2. The device of claim 1 further comprising the support plates attached to a frame by an eccentric screw that extends through a cam slot.

3. The device of claim 2 wherein the cam slot is larger than the diameter of a support shaft of the eccentric screw.

4. The device of claim 2 wherein the eccentric screw rotates such that the pair of support plates twist with respect to each other to gain tracking control of the belt.

5. The device of claim 1 wherein the feeder conveyor has multiple lanes.

6. The device of claim 1 wherein when a meat cut engages the toothroll the meat cut is lifted into contact with the overhead conveyor.

7. The device of claim 6 wherein when the meat cut contacts the belt the meat cut increases the contact pressure of the belt on the drive roller.

8. The device of claim 1 further comprising the at least one hold down member having a top edge, food engaging edge, and a rearward edge wherein the food engaging edge and the rearward edge terminate in a nub.

9. The device of claim 1 wherein the belt is soft and non-reinforced.

10. The device of claim 1 wherein the belt is made of urethane.

11. The device of claim 1 wherein the plurality of resistive devices are weights.

12. The device of claim 1 further comprising a stop bar extending between the pair of support plates.

13. The device of claim 12 wherein the stop bar is positioned such that when the at least one hold down member engages the stop bar, the at least one hold down member dwells above the belt.

14. The device of claim 12 wherein the at least one hold down member is configured to pivot.

15. A device for removing skin from meat cuts of irregular thickness comprising:
    an overhead conveyor having a drive roller and a pair of idler rollers rotatably mounted to a pair of support plates;
    a belt extending around the driver roller and the pair of idler rollers;
    at least one hold down member extending between the support plates within a loop of the belt;
    a plurality of resistive devices attached to the at least one hold down members to provide varying resistance, wherein the resistive devices are configured to apply firmer pressure to thinner parts of a meat cut and less pressure to thicker parts of the meat cut thereby providing selective tension of the belt when it engages the meat cut; and
    a skinning assembly having a toothroll positioned below the overhead conveyor.

16. The device of claim 15 further comprising a feeder conveyor and a discharge conveyor.

17. The device of claim 15 further comprising the at least one hold down member having a top edge, food engaging edge, and a rearward edge wherein the food engaging edge and the rearward edge terminate in a nub.

18. A device for removing skin from meat cuts of irregular thickness comprising:
    an overhead conveyor having a drive roller and a pair of idler rollers rotatably mounted to a pair of support plates;
    a belt extending around the driver roller and the pair of idler rollers;
    at least one hold down member extending between the support plates within a loop of the belt;
    the at least one hold member having a top edge, food engaging edge, and a rearward edge wherein the food engaging edge and the rearward edge terminate in a nub;
    a plurality of resistive devices attached to the at least one hold down member to provide varying resistance; and
    wherein the support plates are attached to a frame by an eccentric screw that extends through a cam slot.

* * * * *